A. C. LINDGREN.
COMBINED LISTER PLOW AND PLANTER.
APPLICATION FILED JUNE 10, 1910.
1,006,388.
Patented Oct. 17, 1911.
4 SHEETS—SHEET 4.
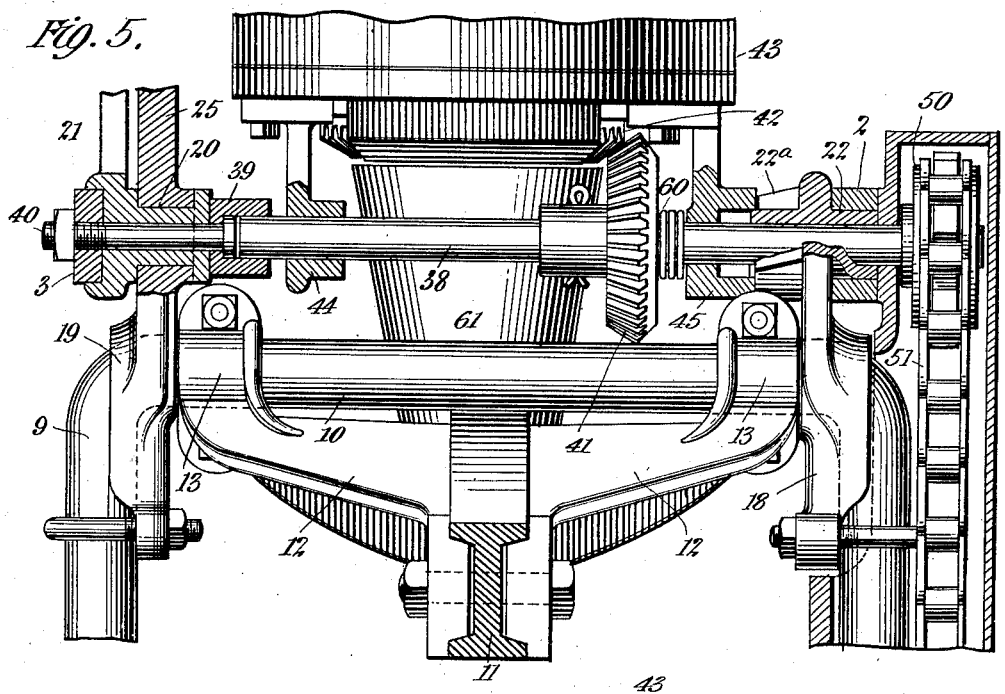
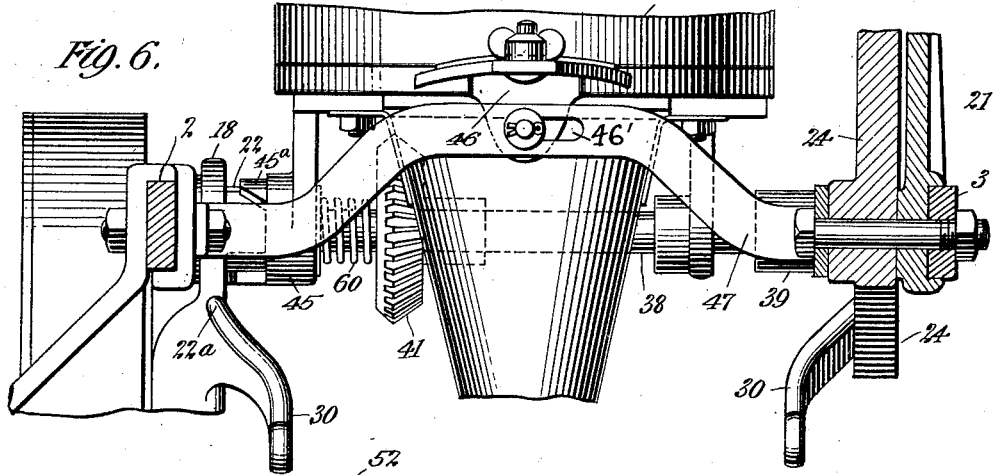
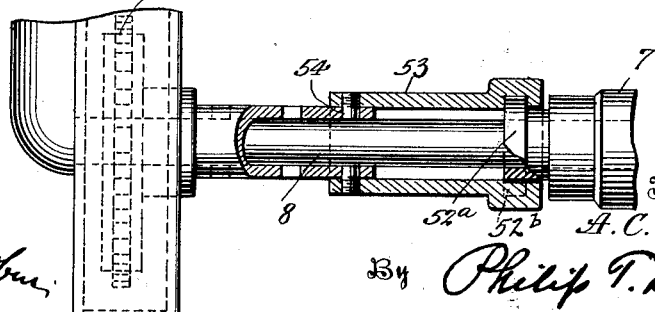

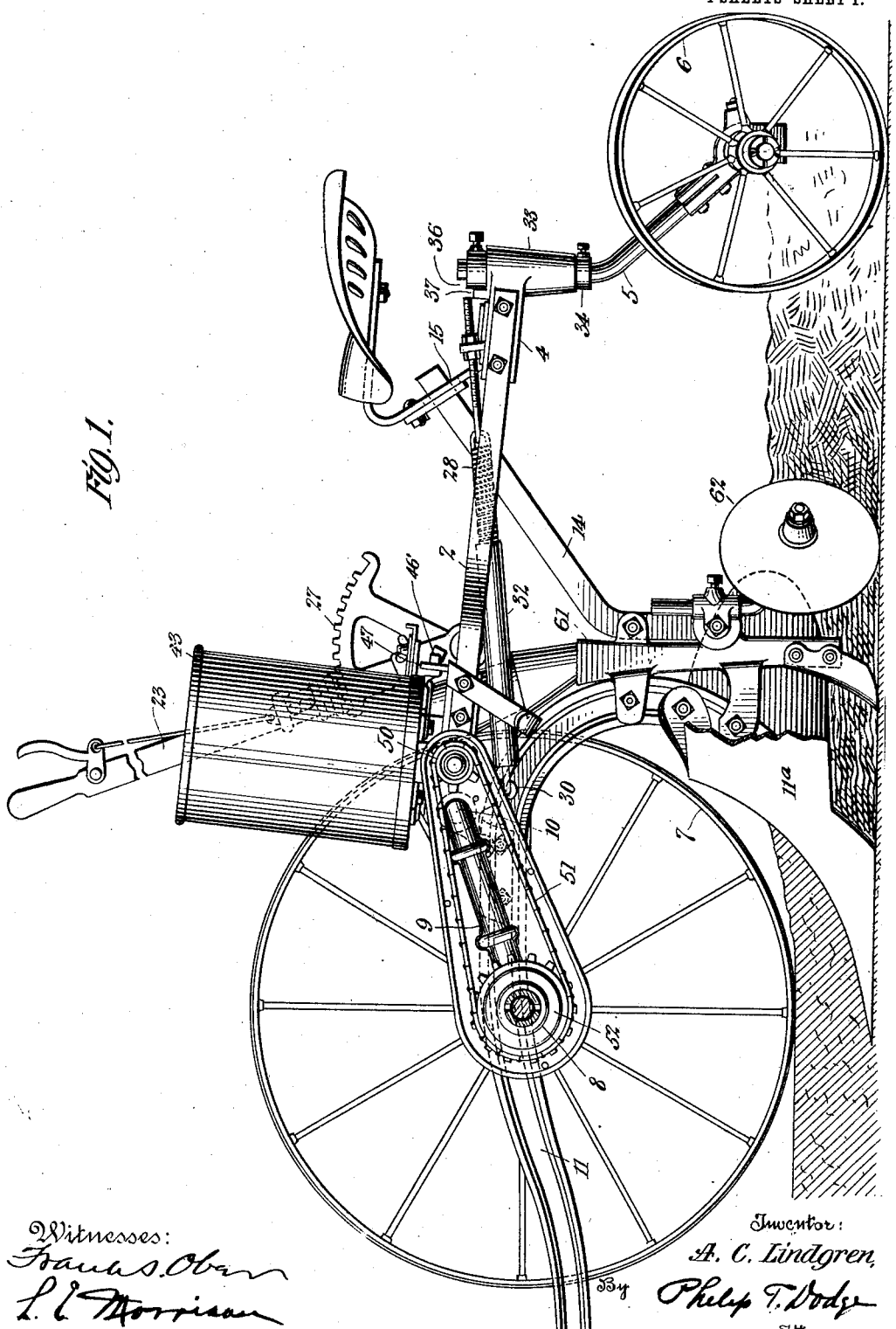

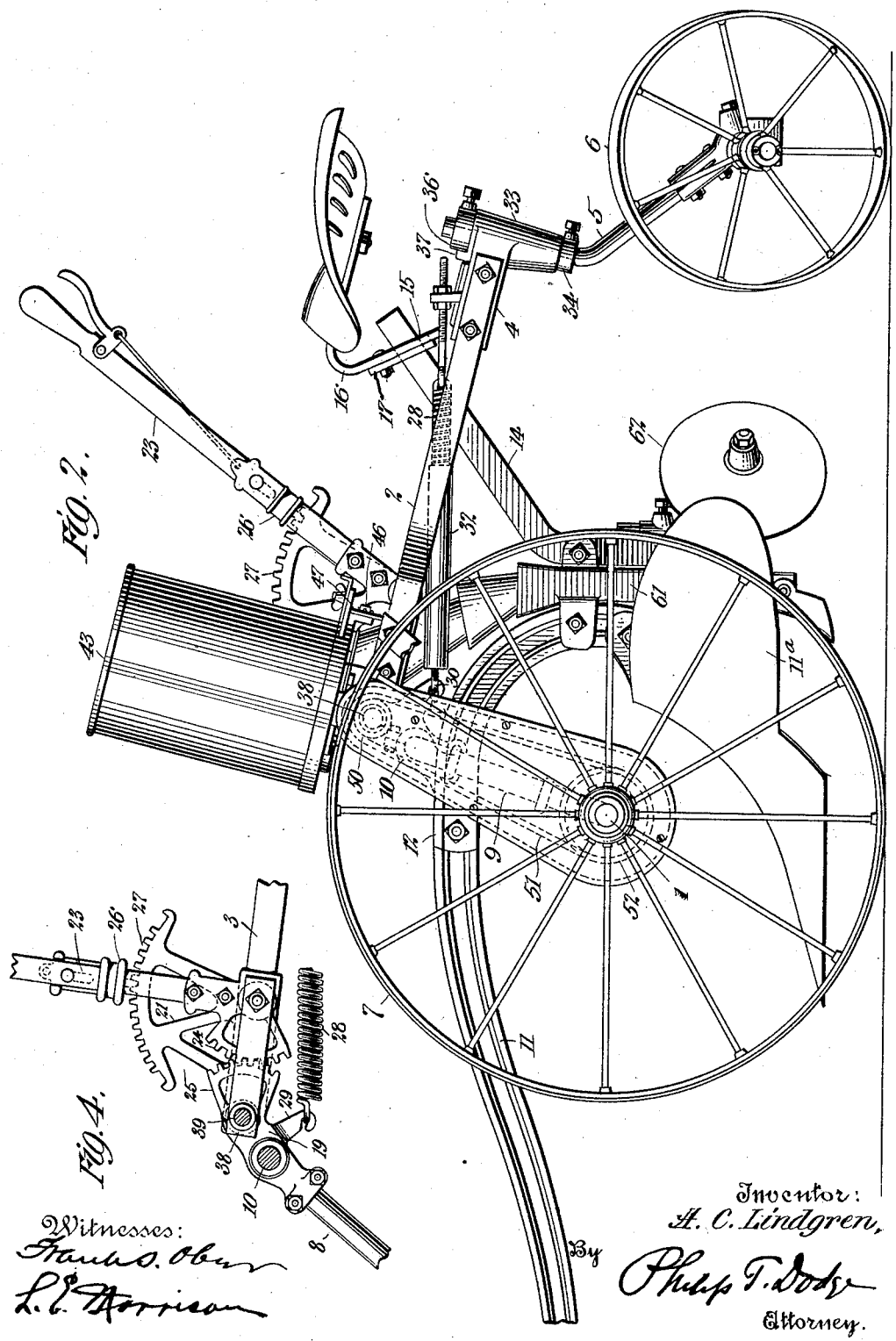

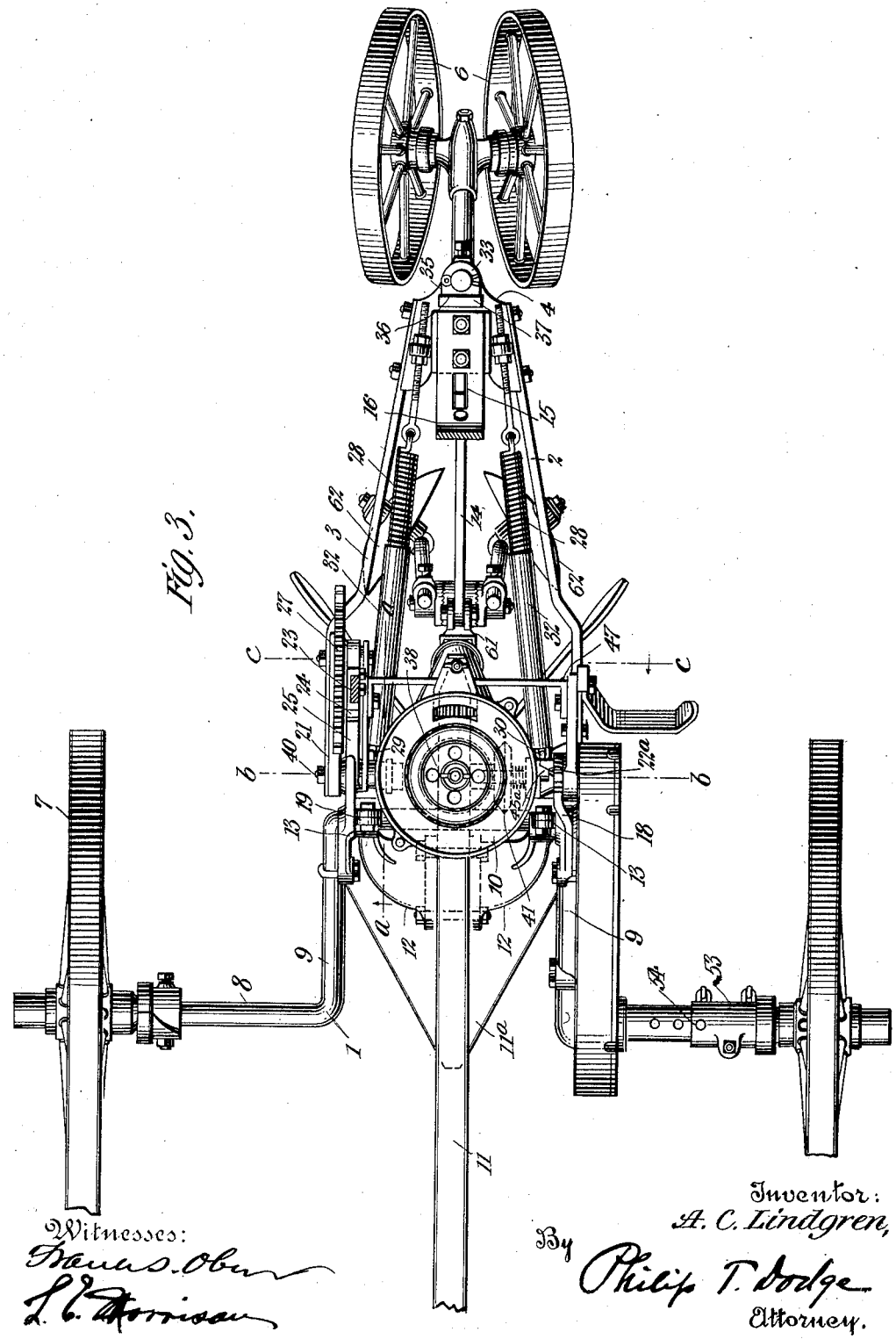

UNITED STATES PATENT OFFICE.

ALEXUS C. LINDGREN, OF MOLINE, ILLINOIS, ASSIGNOR TO MOLINE PLOW COMPANY, A CORPORATION OF ILLINOIS.

COMBINED LISTER-PLOW AND PLANTER.

1,006,388. Specification of Letters Patent. Patented Oct. 17, 1911.

Original application filed March 4, 1908, Serial No. 419,119. Divided and this application filed June 10, 1910. Serial No. 566,214.

*To all whom it may concern:*

Be it known that I, ALEXUS C. LINDGREN, of Moline, county of Rock Island, and State of Illinois, have invented a new and useful Improvement in Combined Lister-Plows and Planters, of which the following is a specification, this being a division of an application filed by me on the 4th day of March, 1908, Serial No. 419,119.

This invention relates to what are known in the art as "lister planters," which machines embody usually a wheeled frame equipped with a double mold board plow or sweep to remove the surface of the soil, a sub-soiler or furrow opener following immediately behind the plow to open the furrow for the seed, a seed-dropping mechanism to deposit the corn in the furrow made by the sub-soiler, and a covering device to cover the deposited seed.

My invention consists in various improvements of machines of this general type having in view durability and simplicity of construction and effectiveness in operation, which improvements will be fully described in the specification and the novel features pointed out in the claims.

In the accompanying drawings:—Figure 1 is a side elevation of my improved machine with the plow in lowered position as in action. Fig. 2 is a similar view showing the plow raised. Fig. 3 is a top plan view with the seed hopper removed. Fig. 4 is an elevation of a detail. Fig. 5 is a longitudinal vertical section on the line $b-b$ of Fig. 3. Fig. 6 is a transverse sectional elevation on the line $c-c$ of Fig. 3 taken longitudinally through the driving shaft for the seeding mechanism. Fig. 7 is a sectional view through the stub end of the axle, on which the driving sprocket is mounted, showing the flexible dust-proof connection between the driving wheel and said sprocket.

Referred to the drawings:—the frame of my improved machine comprises a front member in the form of an arched axle 1, and a rear member in the form of two frame bars 2 and 3 having their forward ends jointed to the arched axle in the manner to be presently described, and their rear ends bolted to the sides of a casting or block 4, in which the upper end of a caster wheel stem 5 is swiveled, the lower end of said stem being provided with caster wheels 6 to support the rear end of the frame. At its front, the frame is supported by ground wheels 7 mounted on the horizontal stub ends 8 of the arched axle, which comprises the parallel members 9 and the arched portion 10.

11 represents a longitudinally extending plow beam carrying a double mold board plow 11$^a$, which beam extends centrally beneath the arched portion of the axle to which it is loosely suspended by means of bracket plates 12 bolted to the opposite sides of the beam and having bearings 13 in their outer ends in which the arched portion 10 of the axle is loosely mounted in such manner that the beam may rock thereon, so that notwithstanding the varying angles to which the parts of the frame may be adjusted in raising and lowering the plow, the beam may be caused to always maintain a truly horizontal position in order to preserve the level of the plow. The control of the movements of the beam to thus preserve the level is effected by means of an arm 14 extending rigidly from the beam obliquely upward through a vertical slot 15 in the seat standard 16, which slot is surrounded by a vertically adjustable block 17 containing a vertical guiding slot for the arm, and by means of which said arm may be changed in position in a vertical direction in order to vary the pitch or inclination of the plow.

The pivotal connection of the front and rear members of the frame is formed in the following manner: Extending upwardly from the arched portion of the axle at opposite sides, and bolted to the parallel limbs 9 of said axle, are two arms 18 and 19, the arm 19 being formed with a circular bearing opening in which is loosely mounted a hollow sleeve 20 projecting inwardly from a frame 21 bolted to the inner side of the frame bar 3 at its forward extremity. The other arm 18 is provided with a hollow sleeve 22 on which is loosely mounted the forward end of the other frame bar 2, the pivotal connection of the frame bars and the arched axle being thus on a transverse axis passing centrally through the openings in said sleeves, on which axis the two parts of the frame are adapted to fulcrum in the operation of raising and lowering the plow.

The raising and lowering of the plow is effected by means of a hand lever 23, pivoted at its lower end to the frame bar 3 and provided with a segment gear 24 meshing with a segment gear 25 formed on the axle arm 19, the said lever being further provided with a locking dog 26 adapted to interlock with a segment rack 27 on the frame 21, whereby the two members of the wheeled frame, adjusted by means of said lever, may be held in their adjusted positions. When the driver pulls the hand lever rearwardly toward him, the parallel limbs of the arched axle, which when the plow is in action extend forwardly and downwardly, will be thrown to the rear, and the ground wheels will be moved toward the plow, at the same time the rear portion of the frame, comprising the frame bars 2 and 3, will be drawn forward, and the plow beam suspended from the arched portion of the axle will be bodily raised, the horizontal relation of the beam to the jointed member of the frame being maintained and the "level" of the plow preserved by means of the guide arm 14, which when the plow beam is raised, slides upwardly through the guide block on the seat standard. When, now, the plow beam is to be lowered, the driver pushes forwardly on the hand lever, with the result that the ground wheels will be forced forward away from the plow, and the rear portion of the frame will be moved rearwardly and the plow will be lowered.

It will be noted that in the raising and lowering of the plow, the parts of the frame assume respectively a contracted or folded position, and a "spread out" condition, that is to say, when the hand lever is thrown rearwardly, to elevate the plow, the two parts of the frame are drawn together, the included angle being decreased and the axial connection of the two parts of the frame being raised; and when the hand lever is thrown forwardly, the two parts of the frame are spread out and the included angle increased and the axial connection lowered. This action I deem of great advantage, in that the machine is given a long and extended supporting base when in action, which is due to the increased distance between the two points of support represented by the ground wheels at the front and the caster wheels at the rear, consequently the machine will not be sensitive to lateral strains or movements and will travel forward truly in the line of draft. Furthermore, by reason of the fact that in this position of the parts the tread of the ground wheels is considerably in advance of the plow, ample room is given at the sides of the plow for the furrow to be turned without coming into contact with the wheels. When now the plow is raised, the supporting base is greatly lessened in extent by reason of the fact that the ground wheels will move to the rear and will stand opposite the plow, the rear caster wheel at the same time being drawn forward, the result being that the leverage by which the plow is turned by the animals pulling on the beam is greatly increased, so that the machine is correspondingly more sensitive to side strains and may be readily turned by the animals at the end of the furrows.

In order that the driver may be assisted in the operation of raising the plow, lifting springs 28 are provided which act on the axle arms 18 and 19 in such manner that the springs have a constant tendency to draw the ground wheels rearwardly and thereby raise the beam. I prefer to employ for this purpose coiled springs which are arranged horizontally and longitudinally of the frame with their forward ends connected to fingers 29 and 30, depending respectively from the arms 18 and 19, and which have their opposite ends connected to the frame at its rear extremity. By reason of the location of these springs above the plow, it has been found that when in action the soil from the furrow, as it is turned, is apt to become clogged between the coils of the spring, and to prevent this, the springs are inclosed in tubular casings 32, which while not interfering with the functions of the springs, effectually protect the same and prevent the entrance of dirt between the coils. The raising of the plow is also greatly assisted by the draft of the team on the beam, which draft acting on the arched portion of the axle from which the beam is suspended will tend to draw it forwardly and thereby assist in forcing the ground wheels rearwardly.

The caster wheel stem 5, before alluded to, is mounted in the rear end of the frame in such manner that when the plow is in action and traveling in a straight line, the caster wheel will be held locked and will follow truly in the line of draft and will be auotmatically unlocked and be free to swivel when the plow is to be turned at the end of the furrow. To effect this action, the block 4 at the rear end of the frame is formed with a depending tubular extension 33 having a vertical opening to receive the caster wheel stem, which opening flares or is widest at its upper end so that the stem may rock or tip therein. The lower end of this tubular extension rests on a collar 34 fixed adjustably to the stem by means of a set-screw, while the stem at a point above the upper end of the tubular extension is encircled by a head 35 fixed to the same by means of a set-screw and having one side flattened, as at 36, to bear against a flattened lug 37 extending upwardly from the block 4, the relation of these parts being such that when the flattened surface of the head bears against said lug, the caster wheel will be straight in the line of draft and will travel straight forwardly, in which position it will be held by the engagement of the two flattened surfaces, their engagement being maintained by the weight of the machine and driver acting on the stem, and causing it to incline forwardly in the tubular extension 33. When the plow is lowered and the parts of the frame are spread out, the caster wheel stem assumes a great forward inclination and bears with greater force on the locking lug 37, so that it will be held more securely locked in position. When, however, the plow is raised and the parts of the frame are drawn toward each other, the stem will assume less of an upright position and will bear with less force against the locking lug, so that when the plow is turned at the end of the furrow, the flat coöperating surfaces will readily disengage and the caster wheel will be freed to swivel in the frame and follow the latter as it is turned to take the next furrow.

The seed discharging mechanism is driven by means of an operating shaft 38, see Fig. 5, extending loosely through and having a bearing at one end within the sleeve 22 on the axle arm 18 and having a bearing at its opposite end in a bearing block 39 on the inner end of a bolt 40 extending outwardly through the sleeve 20 and the frame bar 3, the outer end of the bolt having applied thereto a fastening nut. The shaft 38 has fixed to it a bevel pinion 41 meshing with and driving a bevel gear 42 mounted in the bottom of the seed hopper 43 and acting to operate the seed discharging mechanism therein. The seed hopper is provided at diametrically opposite sides with depending lugs 44 and 45 loosely encircling the operating shaft, whereby the hopper is movably sustained and may be shifted along said shaft, as will presently be described, in order to disengage the seed discharging mechanism from the pinion 41, the rear side of the hopper being sustained and guided in its sliding movements by means of a rearwardly extending finger 46 projecting through a horizontal guiding slot 46' in a transversely extending bar 47, fixed at its opposite ends to the two frame bars. That end of the operating shaft adjacent the bearing sleeve 22 is extended beyond said sleeve and has fixed to it a sprocket wheel 50 which is driven by means of a sprocket chain 51 from a sprocket wheel 52 on the horizontal stub end of the arched axle, which sprocket wheel is driven by the ground wheel through the medium of a two-part separable coupling sleeve 53 interlocked at its opposite ends with the ground wheel and with the sprocket wheel respectively.

The coupling sleeve is for the purpose of preventing the rocking or loose motion of a badly fitting or worn ground wheel from causing the driving sprocket to bind or run unevenly, the sleeve by being interlocked at its end with the ground wheel and sprocket wheel forming a loose or flexible driving connection between said parts. For the purpose of preventing the entrance of dust or dirt to the bearing surfaces of the wheels, the inner end of the hub of the ground wheel is formed with a peripheral flange 52$^a$, which when the sleeve is in place enters a corresponding groove in the latter 52$^b$, one of said parts being formed with a lug which enters a recess in the other and forms a driving connection by means of which the rotary motion of the ground wheel will be imparted to the sleeve. At its opposite end, the sleeve fits over the outer end of an extension on the hub of the sprocket wheel, which latter is formed with sockets receiving a lug 54 on the interior of the sleeve, by means of which these parts are interlocked and a driving connection is formed between the sleeve and the sprocket wheel.

The shifting of the seed hopper along the shaft whereby the bevel gear is disengaged from the bevel pinion in order to render the seeding mechanism inoperative, is controlled and effected by the adjustment of the front and rear members of the frame to raise and lower the plow, means being provided whereby when the plow is raised the seed hopper will be automatically moved along the shaft and the driving mechanism disengaged. This operation is effected by a rotary action by forming on the seed hopper supporting lug 45, a cam surface 45$^a$ which is engaged by a cam surface 22$^a$ on the side of the bearing sleeve 22, the relation and form of these parts being such that when the hand lever is thrown forwardly and the arched axle rocked to raise the plow the cam surface on the sleeve 22 will bear against that on the lug 45 and will forcibly slide the seed hopper along the operating shaft, thereby disengaging the bevel gear 42 from the driving bevel pinion 41, whereupon the action of the seeding mechanism will be arrested. When the plow is lowered, the cam surface on the sleeve 22 being moved away from the other cam surface, the seeding hopper is slid back to its former position by means of a spiral spring 60 encircling the said shaft between the bevel pinion 41 and the bearing lug 45 and the bevel gear 42 will be again engaged with the driving pinion. The seed discharged by the seeding mechanism is directed into the upper end of a vertical tubular conductor 61, which is fixed to the plow beam and has applied to its lower end the sub-soiler or furrow opener, from which conductor the seed enters the ground in the furrow formed thereby, covering disks 62 being applied to said conductor and acting to throw the soil inward and cover the seed in the furrow.

Having thus described my invention, what I claim is:—

1. In combination with a wheeled frame, comprising frame members jointed together on a horizontal transverse axis, a furrow opener sustained thereby, means for adjusting the frame members toward and from each other to raise and lower the furrow opener, a seed discharging mechanism, an operating shaft therefor, and means turning about the axis of said shaft for effecting its disengagement from the seed discharging mechanism and controlled in its action by the adjustment of the frame members.

2. In combination with a wheeled frame, comprising frame members jointed together on a horizontal transverse axis, a furrow opener sustained thereby, means for adjusting the frame members toward and from each other to raise and lower the furrow opener, a seed discharging mechanism, an operating shaft therefor, and a rotary cam turning about the axis of said shaft for effecting its disengagement from the hopper and controlled in its action by the adjustment of the frame members.

3. In combination with a wheeled frame, comprising frame members jointed together on a horizontal transverse axis, a furrow opener sustained thereby, means for adjusting the frame members toward and from each other to raise and lower the furrow opener, a seed hopper, an operating shaft therefor, a cam surface formed on one of said parts, and a co-acting cam surface formed on one of the frame members; whereby the engagement and disengagement of the hopper and its operating shaft will be controlled by the adjustment of the frame members.

4. In combination with a wheeled frame, comprising frame members jointed together on a horizontal transverse axis, a furrow opener sustained thereby, means for adjusting the frame members toward and from each other to raise and lower the furrow opener, a seat discharging mechanism, an operating shaft therefor mounted to turn about an axis coincident with the axis of the frame members, a driving element carried by one of the frame members, and connections between said element and operating shaft; whereby the frame members may be readily adjusted to and from each other to raise and lower the furrow opener without interfering with the connection between the driving element and operating shaft.

In testimony whereof I hereunto set my hand this 23rd day of May, 1910, in the presence of two attesting witnesses.

ALEXUS C. LINDGREN.

Witnesses:
L. C. BLANDING,
C. A. BARRISTER.

---

Copies of this patent may be obtained for five cents each, by addressing the "Commissioner of Patents, Washington, D. C."